(12) United States Patent
Stelandre et al.

(10) Patent No.: US 6,601,897 B2
(45) Date of Patent: Aug. 5, 2003

(54) VEHICLE INTERIOR PANEL HAVING COMPARTMENT AND SWING DOOR

(75) Inventors: Bertrand Stelandre, Cappelle en Pevele (FR); Olivier Charlet, Beaucamps (FR)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/032,271

(22) Filed: Dec. 21, 2001

(65) Prior Publication Data

US 2003/0116988 A1 Jun. 26, 2003

(51) Int. Cl.⁷ .................................................. B60R 7/06
(52) U.S. Cl. ................................. 296/37.12; 296/37.8
(58) Field of Search .............................. 296/37.1, 37.8, 296/37.12; 180/90; 312/326, 327, 328

(56) References Cited

U.S. PATENT DOCUMENTS

| | | | |
|---|---|---|---|
| 2,161,770 A | | 6/1939 | Visser |
| 2,939,604 A | | 6/1960 | Falk |
| 3,414,318 A | * | 12/1968 | Porsche |
| 3,452,835 A | * | 7/1969 | Deli et al. |
| 4,239,277 A | | 12/1980 | Oda |
| 4,596,416 A | * | 6/1986 | Muller ............... 296/37.12 |
| 5,890,755 A | | 4/1999 | Speelman et al. |

FOREIGN PATENT DOCUMENTS

DE        34 27 296 A1    9/1985

* cited by examiner

*Primary Examiner*—Joseph D. Pape
(74) *Attorney, Agent, or Firm*—Brinks Hofer Gilson & Lione

(57) ABSTRACT

The present invention involves a vehicle interior panel. The interior panel comprises a panel body having a face defining a compartment having an opening at the face and defining a door-receiving space underlying the compartment. The interior panel further comprises a swing door including a door panel and an arm extending from the door panel to an end, wherein the end is remote from the door panel and has a pivot point adjacent the end. The door panel is configured to close the opening and pivotally move between a closed position wherein the door panel closes the opening and an open position wherein the door panel is received in the door-receiving space to permit access to the compartment. The interior panel further comprises a pivot connection pivotally connecting the arm at the pivot point to the panel body to define a pivot access providing pivotal movement of the door panel between the closed and open positions. The arm is connected to the panel body at a connection point spaced apart from the face. The swing door is pivotally moveable about the pivot access to swing between the closed position and the open position in the door-receiving space.

27 Claims, 3 Drawing Sheets

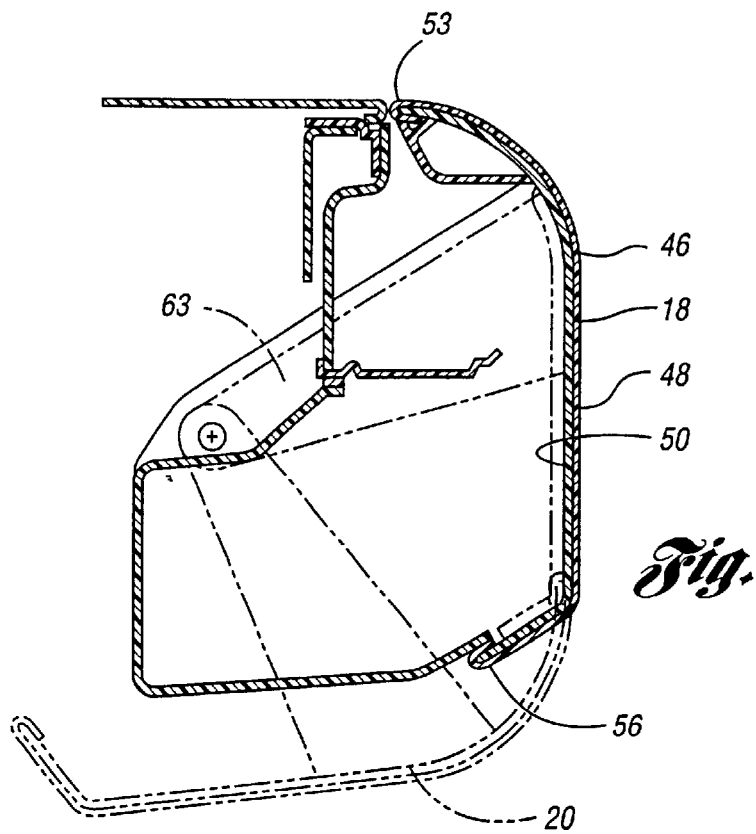
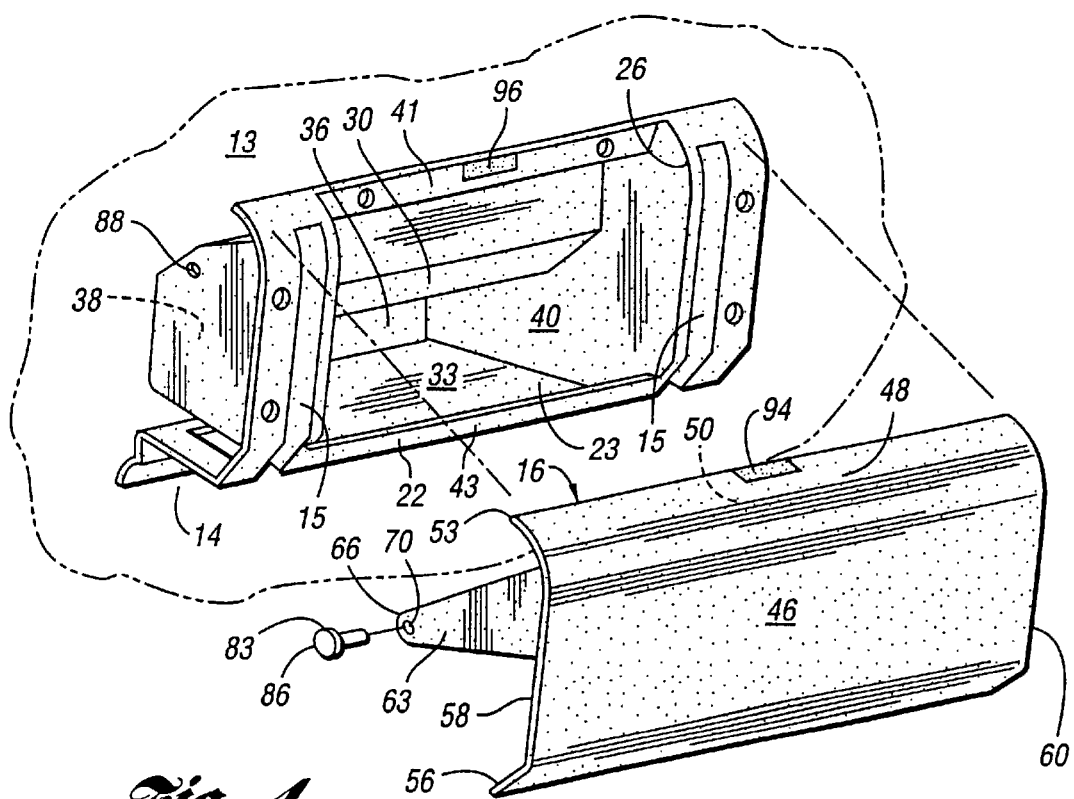

VEHICLE INTERIOR PANEL HAVING COMPARTMENT AND SWING DOOR

BACKGROUND OF THE INVENTION

The present invention relates to a vehicle interior panel having a compartment and a swing door to close and open the compartment.

A vehicle front interior panel having a compartment, also known as a "glove box," can be found in most vehicles today. Typically located adjacent a front passenger seat in the vehicle, the glove box of the front interior panel has a door panel which pivots between closed and open positions. From the closed position to the open position, the door panel is generally required to move in the direction toward the passenger seat. In many situations, the door panel in the open position may compromise space occupied by an occupant or may even contact the occupant's body situated in the passenger seat. The legs or the body of the occupant may contact the door panel when moving from the closed to the open position. Thus, improvements may be desirable.

BRIEF SUMMARY OF THE INVENTION

The present invention generally provides a vehicle interior panel having a compartment and a swing door which swings from a closed position to an open position without compromising the space of a passenger. The present invention includes the vehicle interior panel including a panel body having the compartment and an opening at a face of the panel body for access to the compartment. The swing door is engageable with the face of the panel body to close the opening. The swing door is configured to pivotally move between a closed position to close the opening and an open position wherein the door panel is received in the door-receiving space defined by the panel body underlying the compartment, permitting access to the compartment without compromising the space of a passenger. Additionally, the present invention allows the compartment to be accessible in the open position without contacting the passenger's body. Thus, the present invention reduces an inconvenience of obstructing the path of a compartment door when it moves in the open position or an inconvenience of contacting the passenger's body when the door is being opened.

BRIEF DESCRIPTION OF THE DRAWINGS

FIG. 3 is a cross sectional side view of the compartment assembly in FIG. 2 taken along lines 3—3;

FIG. 4 is an exploded view of the interior panel compartment assembly shown in FIG. 2 in accordance with the present invention;

DETAILED DESCRIPTION OF THE INVENTION

Figure 1:
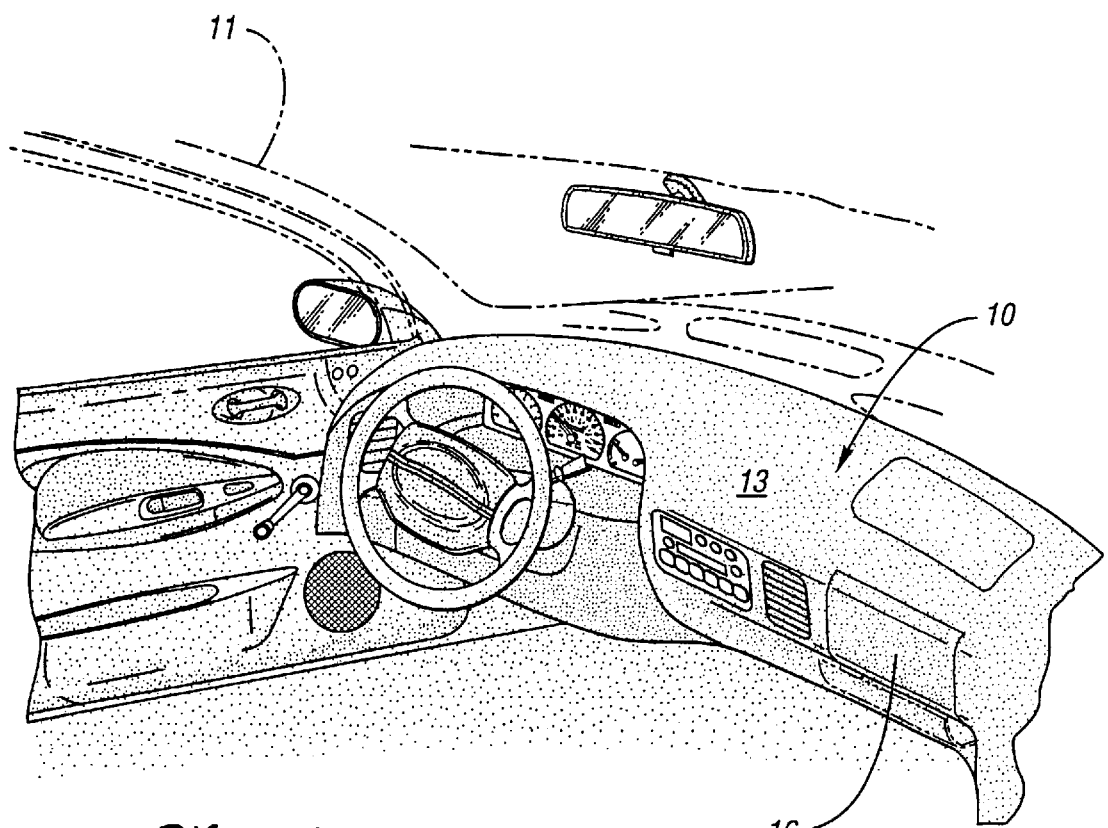
FIG. 1 is a perspective environmental view of a vehicle interior panel including an interior panel compartment assembly in accordance with one embodiment of the present invention.
Figure 2:
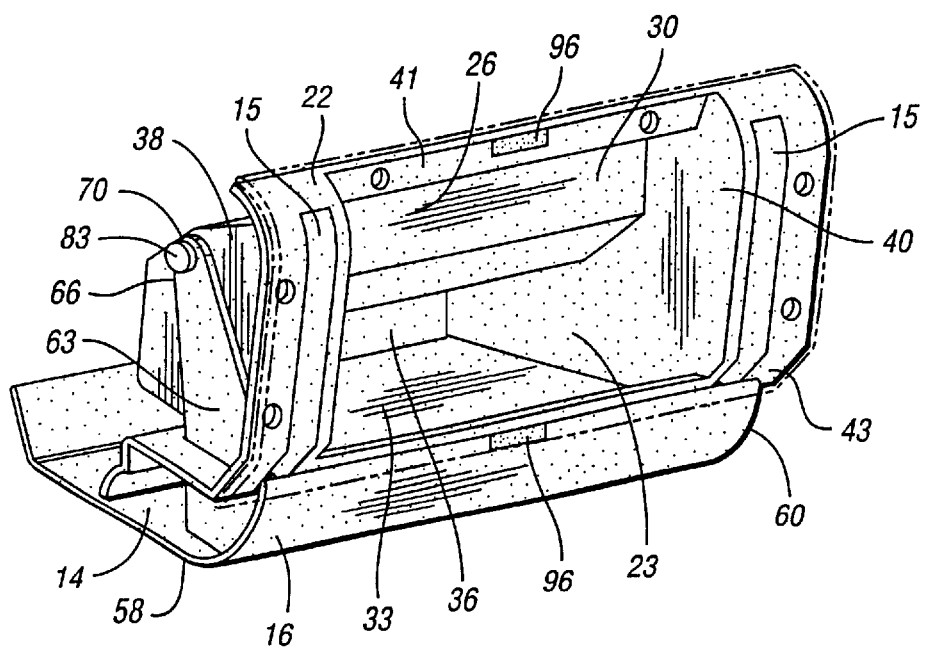
FIG. 2 is a front view of the interior panel compartment assembly of the vehicle interior panel shown in FIG. 1.

FIG. 1 illustrates a vehicle interior panel 10 of vehicle 11. As shown, interior panel 10 generally includes panel body 13 and swing door 16. As shown in FIGS. 1 and 2, panel body 13 includes a face 22 and aperture 27 at the face. Panel body 13 has compartment assembly 23 attached thereto and having an opening 26 which is aligned with aperture 27 at face 22. Face 22 has top and bottom ends 41, 43. Panel body 13 defines a door-receiving space 14 which underlies compartment 23. Panel body 13 also defines arm-receiving slots 15 in adjacent lateral relationship with compartment 23. As shown in FIG. 2, compartment 23 includes top-and bottom walls 30, 33 integrally connected by back wall 36 and first and second side walls 38, 40 defining face 22 having opening 26 for access to the compartment 23;

Swing door 16 includes door panel 46 having outer surface 48 and inner surface 50 which engages with face 22 to close opening 26 in a closed position 18. Door panel 46 further includes upper and lower ends 53, 56 which are engageable with top and bottom ends 41, 43 of face 22, respectively. Door panel 46 further includes first and second lateral sides 58, 60, as shown, which engage with face 22 in the closed position 18.

As shown in FIGS. 3 and 4, swing door 16 further includes first and second arms 63, which are connected to inner surface 50 of door panel 46 adjacent lateral sides 58, 60 and extend therefrom. In this embodiment, the arms 63 extend substantially orthogonal from door panel 46 to respective ends 66. However, the arms may extend from the door panel to the respective ends in any other suitable manner. First arm 63 extends from first lateral side 58 to first end 66, and the second arm extends from second lateral side 60 to the second end. Each of the ends 66, 76 are remote or spaced apart from door panel 46 and have a pivot point thereon. First pivot point 70 is defined on first end 66, and second pivot point 80 is defined on the second end. Door panel 46 is configured to pivotally move between the closed position 18 wherein the door panel 46 closes opening 26 and an open position 20 wherein door panel 46 is received in the door-receiving space 14 and arms 63 are received in arm-receiving slots 15. This permits access to the compartment 23 without compromising space occupied by an occupant of the vehicle. As shown, lateral sides 58, 60 laterally extend beyond the arms to cover slots 15.

As shown in FIGS. 3 and 4, interior panel 10 further includes first and second connection members or pivot connections 83, e.g., pins, pivotally connecting the ends 66, of the arms to panel body 13 at pivot points 70. This defines a pivot axis 86 about which arms 63, and door panel 46 pivotally move between closed and open positions 18, 20. In this embodiment, connection members 83, are pins connecting ends 66 to panel body 13. However, it is understood that pivot connections 83 may include any other suitable means of connecting the ends to the panel body, e. g., bolts, screws, or clips.

As shown, first connection member 83 connects first end 66 to panel body 13 at first connection point 88 which is located on panel body 13 along general pivot axis 86 remote or spaced apart from face 22. Second connection member 90 connects the second end to panel body 13 at a second connection point which is located on body 13 along pivot axis 86. This allows first and second arms 63, and door panel 46 to be pivotally moveable about general pivot axis 86 between the closed and open positions 18, 20. As shown, arms 63, are connected to panel body 13 at connection points 88 which are spaced apart from face 22 and door-receiving space 14. This configuration allows swing door 16 to be pivotally moveable about pivot axis 86 and to swing away from the closed position 18 to the open position 20 relative to an occupant situated in a seat, e.g., the front passenger seat, of the vehicle. As shown, when swing door swings away from the closed position to the open position 20, arms 63 are received in the arm-receiving slots 15 and door panel 46 is received in the door-receiving space 14. This provides an occupant with access to compartment 23 without compromising space occupied by the occupant.

In this embodiment, upper end 53 of door panel 46 has a latch 94. Top end 41 of face 22 has a latch-receiving member 96 which receives the latch 94 to retain door panel 46 in the closed position 18. As shown in FIG. 3, in the open position 20, door panel 46 swings below body panel 13 away from an occupant's space so that door panel 46 is completely received is door-receiving space 14.

As shown, each of the connection members 83, is disposed remotely from door panel 46 and bottom end 43 of face 22. The distance between the members 83, and door panel 46 is greater than the distance between the members 83 and the bottom end 43 of face 22. This allows a clearance for the swing door 16 to swing between the closed and open positions when latch 94 is released from latch-receiving member 96. In this embodiment, the distance between members 83, and door panel 46 is slightly greater than the distance between members 83, and bottom end 43. This allows door panel 46 to hug bottom end 43 as swing door moves between the open and closed positions.

As shown in this embodiment, door-receiving space 14 underlies compartment. However, it is understood that the door-receiving space may overlie the compartment without following beyond the scope or spirit of the present invention.

Figure 5:
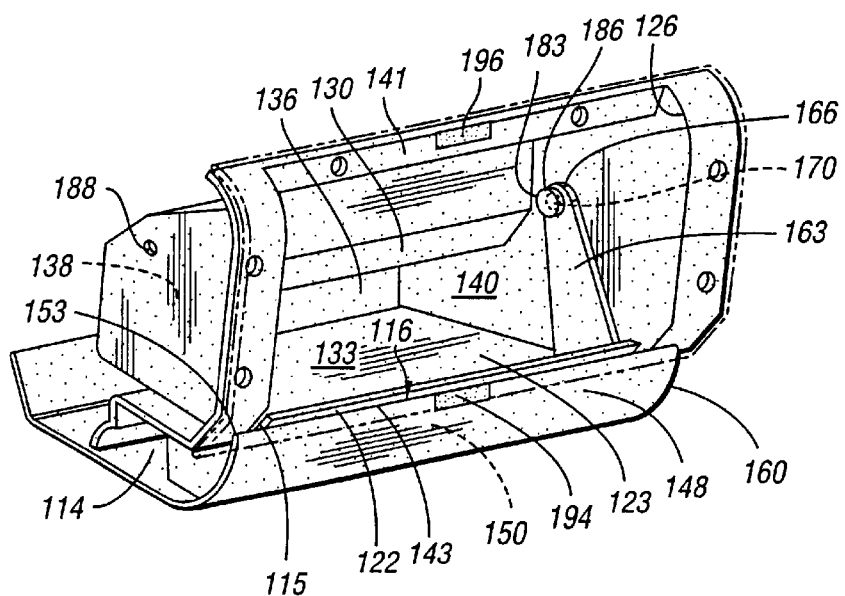
FIG. 5 is a front view of another embodiment of the compartment assembly in accordance with the present invention.
Figure 6:
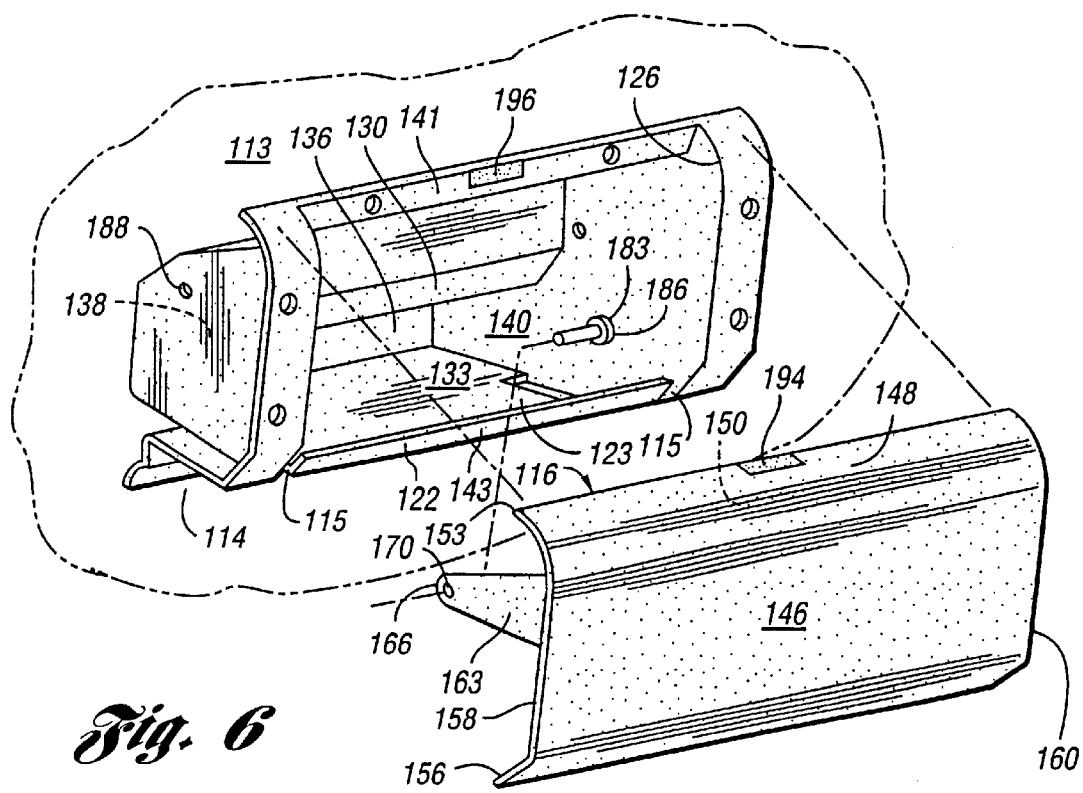
FIG. 6 is a cross-sectional side view of the compartment assembly in FIG. 5 taken along lines 5—5.

FIG. 5 and 6 depict another embodiment of the present invention. As shown in FIGS. 5 and 6, vehicle interior panel 110 has similar members as panel 10 described above. For example, panel body 113, face 122, opening 126, and door panel 146 of interior, panel 110 are similar to body 13, face 22, opening 26, and door panel 46, respectively, of interior panel 10. In this embodiment, arms 163, 173 extend from door panel 146 to respective ends 166, 176 which pivotally attach to side walls 138, 140, respectively, within compartment 123. As shown, arms 163, 173 are configured to extend through opening 126 into compartment 123. Bottom wall 133 is slotted to allow arms 163, 173 to swing therethrough when door panel is moved between the closed and open positions. This embodiment allows arms 163, 173 to be hidden or stored within compartment 123 in the closed position and eliminates space otherwise required for arm-receiving slots.

It is to be understood that the door panel may run or ride on a track attached thereto and to the body, panel, thereby eliminating the need for the arms extending from the door panel. The track may be attached along the body panel and extend to the door-receiving space. The door may then slide along the track between the closed and open positions.

While the present invention has been described in terms of preferred embodiments, it will be understood, of course, that the invention is not limited thereto since modifications may be made to those skilled in the art, particularly in light of the foregoing teachings.

What is claimed is:

1. An interior panel compartment assembly of a vehicle interior panel, the interior panel having a panel body to which the assembly attaches, the panel compartment assembly comprising:

a compartment having top and bottom walls integrally connected by a back wall and a pair of side walls defining a face having an opening for access to the compartment, the compartment and the interior panel further defining a door-receiving space adjacent the compartment;

a door panel having an outer surface and an inner surface engageable with the face to close the opening in a closed position, the door panel being pivotally moveable between the closed position and an open position wherein the door panel is received in the door-receiving space to permit access to the compartment;

a pivotable arm attached to the inner surface of the door and extending therefrom pivotally connecting to the vehicle interior panel to define a pivot axis spaced apart from the face and providing the door panel and the arm pivotal movement from the closed position to the open position without moving toward an occupant of the vehicle.

2. The assembly of claim 1 wherein the arm extends substantially orthogonal from the door panel to an end.

3. The assembly of claim 2 wherein the door panel includes first and second lateral sides and wherein the end is a first end and the arm is a first arm extending from the first lateral side of the door panel to the first end, the swing door further including a second arm extending from the second lateral side of the door panel to a second end remote from the door panel, the second end having a second pivot point adjacent the second end.

4. The assembly of claim 1 wherein the panel body further defines an arm-receiving slot in adjacent lateral relationship with the compartment to receive the arm when the swing door swings between the closed and open positions.

5. The assembly of claim 1 wherein the door panel has upper and lower ends and the face of the panel body has top and bottom ends, respectively, engageable therewith, the upper end of the door panel having a latch, the top end of the face having a latch-receiving mechanism to receive the latch and retain the door panel in the closed position.

6. The assembly of claim 5 wherein the upper end of the door panel in the open position is positioned in front of the face of the body panel.

7. The assembly of claim 1 wherein the connection point is spaced apart from the face and the door receiving space.

8. The assembly of claim 5 wherein the connection member is spaced apart from the door panel and the bottom end of the face, wherein the space between the connection member and the door panel is greater than the space between the connection member and the bottom end of the face.

9. The assembly of claim 1 wherein the connection member is a connecting pin.

10. The assembly of claim 1 wherein the door-receiving space underlies the compartment.

11. A vehicle interior panel of a vehicle, the interior panel comprising:

a panel body having a face and an aperture, the panel body further including an attached compartment having an opening aligned with the aperture at the face, the panel body further defining a door-receiving space underlying the compartment;

a swing door including a door panel and an arm extending from the door panel to an end, the end being remote from the door panel and having a pivot point at the end, the door panel being configured to close the opening and pivotally move between a closed position wherein the door panel closes the opening and an open position wherein the door panel is received in the door-receiving space to permit access to the compartment; and a pivot connection pivotally connecting the arm at the pivot point to the panel body to define a pivot axis spaced apart from the face providing pivotal movement of the door panel between the closed and open positions, the arm being connected to the panel body at a connection point spaced apart from the face;

the swing door being pivotally moveable about the pivot axis to swing from the closed position and the open position in the door-receiving space without moving toward an occupant of the vehicle.

12. The interior panel of claim 11 wherein the arm extends substantially orthogonal from the door panel to the end.

13. The interior panel of claim 11 wherein the door panel includes first and second lateral sides and wherein the end is a first end and the arm is a first arm extending from the first lateral side of the door panel to the first end, the swing door further including a second arm extending from the second lateral side of the door panel to a second end remote from the door panel, the second end having a second pivot point adjacent the second end.

14. The interior panel of claim 11 further comprising an arm-receiving slot in adjacent lateral relationship with the compartment to receive the arm when the swing door swings between the closed and open positions.

15. The interior panel of claim 11 wherein the door panel has upper and lower ends and the face of the panel body has top and bottom ends, respectively, engageable therewith, the upper end of the door panel having a latch, the top end of the face having a latch-receiving mechanism to receive the latch and retain the door panel in the closed position.

16. The interior panel of claim 11 wherein the connection point is spaced apart from the face and the door receiving space.

17. The interior panel of claim 15 wherein the pivot connection is spaced apart from the door panel and the bottom end of the face, wherein the space between the pivot connection and the door panel is greater than the space between the pivot connection and the bottom end of the face.

18. The interior panel of claim 11 wherein the pivot connection is a connecting pin.

19. A vehicle interior panel of a vehicle compartment, the interior panel comprising:

a panel body having a face and an aperture at the face;

a retaining compartment having an opening aligned with the aperture, the retaining compartment including top and bottom walls adjacent which a door-receiving space is defined by the interior panel;

a door panel having an outer surface facing the vehicle compartment and an inner surface engageable with the face in a closed position;

a pivotable arm attached to the inner surface of the door panel and extending therefrom to an end remote from the door panel;

a connection member disposed on the panel body and spaced apart from the face, the end of the pivotable arm being attached to the connection member to define a pivot axis about which the arm pivots so that the door panel pivotally moves about the pivot axis between the closed position and an open position in the door-receiving space without moving toward an occupant of the vehicle.

20. The interior panel of claim 19 wherein the arm extends substantially orthogonal from the door panel to an end.

21. The interior panel of claim 20 wherein the door panel includes first and second lateral sides and wherein the end is a first end and the arm is a first arm extending from the first lateral side of the door panel to the first end, the swing door further including a second arm extending from the second lateral side of the door panel to a second end remote from the door panel, the second end having a second pivot point adjacent the second end.

22. The interior panel of claim 19 wherein the panel body further defines an arm-receiving slot in adjacent lateral relationship with the compartment to receive the arm when the swing door swings between the closed and open positions.

23. The interior panel of claim 19 wherein the door panel has upper and lower ends and the face of the panel body has top and bottom ends, respectively, engageable therewith, the upper end of the door panel having a latch, the top end of the face having a latch-receiving mechanism to receive the latch and retain the door panel in the closed position.

24. The interior panel of claim 23 wherein the upper end of the door panel in the open position is positioned in front of the face of the body panel.

25. The interior panel of claim 19 wherein the connection point is spaced apart from the face and the door receiving space.

26. The interior panel of claim 23 wherein the connection member is spaced apart from the door panel and the bottom end of the face, wherein the space between the connection member and the door panel is greater than the space between the connection member and the bottom end of the face.

27. The interior panel of claim 19 wherein the connection member is a connecting pin.

* * * * *